United States Patent [19]
Haschke et al.

[11] Patent Number: 5,914,368
[45] Date of Patent: Jun. 22, 1999

[54] VINYL ALCOHOL COPOLYMERS AND WATER-SOLUBLE FILMS CONTAINING THEM

[75] Inventors: Heinz Haschke, Kottingbrunn; Ralf Rausch, Wien; Franz Reiterer, Innermanzing; Felix Wehrmann, Wien, all of Austria

[73] Assignee: Teich Aktiengesellschaft, Obergrafendorf, Austria

[21] Appl. No.: 08/765,435

[22] PCT Filed: Jul. 21, 1995

[86] PCT No.: PCT/AT95/00151

§ 371 Date: Jan. 15, 1997

§ 102(e) Date: Jan. 15, 1997

[87] PCT Pub. No.: WO96/03443

PCT Pub. Date: Feb. 8, 1996

[30] Foreign Application Priority Data

Jul. 21, 1994 [AT] Austria ..................................... 1448/94

[51] Int. Cl.$^6$ ..................................................... C08F 16/06
[52] U.S. Cl. ................. 525/54.26; 525/54.2; 525/54.21; 525/54.23; 525/61; 525/54.24
[58] Field of Search ................. 525/54.2, 54.21, 525/54.23, 54.24, 54.26, 61

[56] References Cited

U.S. PATENT DOCUMENTS

| | | | |
|---|---|---|---|
| 2,130,212 | 9/1938 | Watkins | 525/61 X |
| 3,034,999 | 5/1962 | Wilson | 260/17.4 |
| 3,098,049 | 7/1963 | Borchert | 260/17.4 |
| 3,316,190 | 4/1967 | Suzumura et al. | 260/17.4 |
| 3,372,156 | 3/1968 | Schwarzer et al. | 260/232 |
| 3,625,746 | 12/1971 | Ayukawa et al. | 525/54.26 X |
| 3,673,125 | 6/1972 | Takahashi et al. | 525/61 |
| 3,737,398 | 6/1973 | Yamaguchi | 260/2.5 |
| 3,838,957 | 10/1974 | Koide et al. | 425/174.6 |
| 3,949,145 | 4/1976 | Otey et al. | 428/423 |
| 3,959,406 | 5/1976 | Tsuji et al. | 260/874 |
| 4,272,470 | 6/1981 | Hsu et al. | 525/61 X |
| 4,357,402 | 11/1982 | Sheibley et al. | 525/61 X |
| 4,419,316 | 12/1983 | Schweiger | 264/184 |
| 5,258,430 | 11/1993 | Bastioli et al. | 525/61 X |
| 5,276,088 | 1/1994 | Yoshinaga | 525/54.3 |

FOREIGN PATENT DOCUMENTS

| | | |
|---|---|---|
| 2 045 811 | 4/1972 | Germany . |
| 2-60906 | 3/1990 | Japan . |

OTHER PUBLICATIONS

H. Roth, "Methoden er organischen Chem. (Houben–Weyl)", vol. II, 1953, Georg Thieme Verlag, Stuttgart, pp. 427–428.
Chemical Abstract 88, 24453t (vol. 88, 1978).
J. Macromol. Sci.–Chem., A13(7), pp. 937–952 (1979).
Chemical Abstract 103, 72848a (vol. 103, 1985).
Chemical Abstract 105, 56225f (vol. 105, 1986).
J. Polym. Mater. 5 (1988) 241–247.

*Primary Examiner*—Judy M. Reddick
*Attorney, Agent, or Firm*—Bacon & Thomas

[57] ABSTRACT

The description relates to vinyl alcohol copolymers which can be produced by the acid-catalysed acetalisation reaction of polyvinyl alcohols with a degree of saponification of 80–99.5 mol % and preferably between 88 and 99.5 mol % with natural substances or their derivatives containing carbonyl or presumptive carbonyl groups. The description also relates to water-soluble films containing such vinyl alcohol copolymers, the solubility of which can be adjusted to the desired solution temperature. Said water-soluble films are used as packaging materials and auxiliaries, e.g. in the form of sealing lacquers.

7 Claims, No Drawings

VINYL ALCOHOL COPOLYMERS AND WATER-SOLUBLE FILMS CONTAINING THEM

BACKGROUND OF THE INVENTION

1. Field of the Invention

The invention relates to vinyl alcohol copolymers, water-soluble films containing them, which films can be used advantageously as packaging material or auxiliaries for packaging purposes, and to a method for producing the said water-soluble films, in particular such with controllable water solubility.

2. Description of Related Art

From EP-A2-283180 water-soluble films on the basis of polyvinyl alcohols are known, namely vinyl alcohol/vinyl acetate copolymers which are partly acetalated with benzaldehyde derivatives. These films are produced by the known film casting method, with the aqueous solution consisting of the acetalated polyvinyl alcohol being cast onto a moved carrier tape by means of a die. Thereafter the film is dried in the manner known per se and drawn off from the carrier tape. The water-soluble film produced in this manner is suitable for the packaging of various alkaline and acidic packed goods such as soaps, detergents or agricultural and industrial chemicals such as insecticides, herbicides, fertilizers, detergents or bleaching agents.

These films are provided with the disadvantage in connection with their use that they can release migration-capable toxic substances in contact with many packaged goods, in particular with alkaline or acidic reacting compounds from foodstuffs. Moreover, such films, which consist nearly completely of synthetic polymers, are provided with low biodegradability owing to their chemical constitution.

From EP-A-304 410 it is known to produce moulded bodies, in particular foils, from destructured starch. Although in this case it concerns a polymer consisting of natural materials, it can be degraded biologically, but only with a relatively low degradation speed. Accordingly, such films can only be disposed of biologically within long periods of time.

Furthermore, the U.S. Pat. No. 3,316,190 described mixtures which are soluble in cold water, consist substantially of polyvinyl alcohol and are obtained by mixing (a) polyvinyl alcohols or acetals produced therefrom, with (b) tensides and (c) optionally also water-soluble starch. In these mixtures the starch component does not contribute to the biological degradability, but only to the avoidance of residual adhesiveness of the films produced from this mixture.

From DE-A-2022875 mixtures of polyvinyl alcohol and starch are known which are used for the production of porous polyvinyl acetate objects.

From U.S. Pat. No. 3,737,398 formalin dialdehyde starch polyvinyl alcohols are known which are used for the surface treatment of metal objects.

Moreover, from U.S. Pat. No. 3,098,049 reaction products are known which are obtained by the conversion of hydrolized polyvinyl acetate polymers with periodate-oxidized polysaccharide. These reaction products are characterized by high resistance to water, i.e. they can be designed as insoluble in water.

Furthermore, it is known to use glass vessels with closures made from metal foils instead of foils as packaging material. The metal foils are attached to the glass vessels by means of lacquer sealing.

In reclaiming the glass vessels it should be possible to remove the sealing lacquer residues very easily. This is prevented in most cases however by the employed sealing lacquer as a result of its low water solubility.

SUMMARY OF THE INVENTION

It is therefore the object of the present invention to provide polymer packaging materials which are rapidly biologically degradable and which simultaneously meet the requirements placed on packaging materials such as sufficient tearing strength and/or a controllable water solubility in the case of packaging auxiliaries such as sealing lacquers or packaging foils.

In accordance with the invention a vinyl alcohol copolymer is proposed which can be produced by acid-catalysed acetalisation reaction of polyvinyl alcohols with a degree of saponification of 88 to 99.5 mol %, preferably between 80 and 99 mol %, with carbonyl groups.

Preferably, vinyl alcohol copolymers are used whose degree of saponification is between 90 and 99 mol %.

Natural substances or their derivatives containing carbonyl groups and their degradation products are regarded as such which are provided with reactive aldehyde or keto groups. Natural substances containing presumptive carbonyl groups are regarded as such which form functional groups under acid-catalysed acetalisation conditions which show the reactions typical for aldehyde and keto groups such as the oxime formation with hydroxyl amines.

Such products are regarded as degradation products of natural substances which originate from natural substances by oxidative or hydrolytic degradation, optionally catalysed under acids or bases, and which are provided with the aforementioned features of the carbonyl groups or presumptive carbonyl groups. This group includes, for example, the water-soluble fractions of hydrolytically degraded and/or mechanically and thermally degraded starch products such as potato or rice starch.

Suitable natural substance derivatives are further water-soluble fractions of oxidative or hydrolytic degradation products of starch as well as natural substances.

Monosaccharides such as aldoses are preferably suitable as natural substances.

Ketoses such as fructose are further suitable for producing the vinyl alcohol copolymers in accordance with the invention as well as disaccharides and trisaccharides, preferably of the reducing "-ose type" such as maltose. Further suitable are polysaccharides such as glycogen, starch or pectines, hyaluronic acid and their hydrolytic or oxidative degradation products.

Mineral acids such as HCl, $H_3PO_4$, as well as sulphuric acid and the strong organic acids such as toluene-p-sulphonic acid which is usually used as catalyst for esterification or acetalisation reactions can be used as acid catalysts for the conversion of the polyvinyl alcohol with the natural substances or their derivatives containing the carbonyl groups or presumptive carbonyl groups and their degradation products. Oxidizing acids such as $HNO_3$ are used particularly in cases when an oxidative degradation of the employed natural substance is desired. At higher reaction temperatures weak organic acids such as ascorbic acid or benzoic acid are suitable as catalysts.

Satisfactory degrees of conversion are achieved at reaction temperatures between 70 and 90° C. under catalysation by strong mineral acids such as $H_3PO_4$ within reaction times of several hours. These reaction times can be reduced by carrying out the acetalisation reactions under pressure. In this way it is possible to advantageously produce a granulate consisting of the vinyl alcohol copolymer in accordance with the invention in which an extruded granulate can be obtained according to the shape of the extruder dies. In this case it is possible to produce the extruded granulate unneutralized.

Phosphoric acid, toluene-p-sulphonic acid, benzoic acid, ascorbic acid, citric acid or tartaric acid are used as catalysts for this kind of conversion.

A water-soluble film is proposed in accordance with the invention whose solubility behaviour is adjustable at temperatures from a maximum of 60 to 80° C. in such a way that the film can be produced from a polyvinyl alcohol with a mean polymerisation degree in a range of 500 to 2800 by acid-catalysed reaction with a natural substance containing carbonyl groups, whose number of carbonyl equivalents per 100 vinyl alcohol equivalents of the polyvinyl alcohol corresponds to the formula $$\frac{\text{degree of saponification (mol \%) PVA}}{2} - (47.6 \text{ to } 49).$$

Furthermore, a water-soluble film is proposed in accordance with the invention whose solubility behaviour is adjustable at temperatures from a maximum of 40 to 60° C. in such a way that the film can be produced from a polyvinyl alcohol with a mean polymerisation degree in a range of 300 to 1500 by acid-catalysed reaction with a natural substance containing carbonyl groups, whose number of carbonyl equivalents per 100 vinyl alcohol equivalents of the polyvinyl alcohol corresponds to the formula $$\frac{\text{degree of saponification (mol \%) PVA}}{2} - (44 \text{ to } 47.5).$$

A further advantage of the water-soluble film in accordance with the invention, whose solubility behaviour is thus adjustable at temperatures from a maximum of 20 to 40° C., is that the water-soluble film can be produced from a polyvinyl alcohol with a mean polymerisation degree in a range of 200 to 2700 by acid-catalysed reaction with a natural substance containing carbonyl groups, whose number of carbonyl equivalents per 100 vinyl alcohol equivalents of the polyvinyl alcohol corresponds to the formula $$\frac{\text{degree of saponification (mol \%) PVA}}{2} - (40 \text{ to } 44).$$

A further modification of the film in accordance with the invention has the advantage that the water-soluble film can be produced by acid-catalysed acetalisation of a polyvinyl alcohol with a polymerisation degree in the range of 200 to 1000 with a natural substance whose carbonyl equivalents can be set according to the formula $$\frac{\text{degree of saponification (mol \%) PVA}}{2} - (42.5 \text{ to } 44).$$

These films are produced with controllable water solubility in such a way that in the conversion of the polyvinyl alcohol with a natural substance or a natural substance derivative with carbonyl groups or presumptive carbonyl groups both the number of employed carbonyl equivalents of the natural substance per number of the free hydroxyl groups in the polyvinyl alcohol as well as the degree of polymerisation of the employed polyvinyl alcohol can be adjusted according to the desired solution temperature of the film in the water. As a result of this adjustment it is possible to achieve the compromise between the biological degradability and the desired physical properties, in particular the temperature from which the films are water soluble at the very latest during the heating.

Furthermore, the invention relates to a method for producing a water-soluble film which is characterized in that the vinyl alcohol copolymer is brought into granulate form with known hydrophilization agents and softening agents and this mixture is thereafter supplied to an extruder where it is heated to flow temperature and thereafter is supplied in the molten form to an extruder die, as a result of which a film or film tube is formed.

A further modification of the method in accordance with the invention for producing the water-soluble film has the advantage that the vinyl alcohol copolymer is produced in an extruder by conversion of the reaction components of polyvinyl alcohol, natural substances or their derivatives containing carbonyl groups under acidic catalysis, and is supplied in the same extruder in the presence of known plasticizing agents and additives to an extruder die so that a film or film tube is formed.

A further advantage of the method in accordance with the invention for producing a water-soluble film is that an extruder with a degassification segment is used for removing the water vapour arising in the granulation process.

For the optimal adjustment of the water solubility behaviour it is possible to use also mixtures of polyvinyl alcohols of different degrees of polymerisation and saponification in the method in accordance with the invention.

This is particularly important due to the fact that—depending on the field of application—films which are not always soluble in cold water may be desirable.

For setting the stoichiometric ratios of the reactants in accordance with the invention, the carbonyl equivalent of the employed natural substance can be calculated with known chemical formula from the molecular weight divided by the number of the existing or presumptive carbonyl groups.

Furthermore, in cases where the number of the presumptive carbonyl groups cannot be forecast from the chemical formula of the natural substance (as is the case for example for starch or its degradation products) the carbonyl equivalent can determined by a blank test under reaction conditions, but without polyvinyl alcohol, and by subsequent taking of samples by "oxime titration" according to H. Schulz, Fauth and Kern; Makromol.Chem. 20 (1956) 161.

The vinyl alcohol equivalent is understood as being the mean molecular weight of the employed polyvinyl alcohol per vinyl unit, divided by one hundredth of the percentage degree of saponification.

Furthermore, the invention relates to the application of a water-soluble film for packaging materials.

The vinyl alcohol copolymers are used in accordance with the invention for the production of sealing lacquers or in mixtures with known polymer hot sealing lacquer components, in particular aqueous polyacrylate dispersions.

DETAILED DESCRIPTION OF THE PREFERRED EMBODIMENT

The invention is now explained in closer detail by reference to the following examples:

A film which is soluble in cold water

EXAMPLE 1

A 1L three-neck flask, equipped with an agitator, reflux condenser, powder feeding device and dropping funnel, is charged with a solution of 100 g polyvinyl alcohol (PVA) of "MOWIOL Type 4-98" of Hoechst Company with a polymerisation degree of 600 and a degree of saponification of 98.4 mol % in 600 ml distilled water.

The polyvinyl alcohol is provided with a vinyl alcohol equivalent of 45.45 corresponding to the formula $$\frac{(44.05 \times 0.984 + 86.09 \times (1 - 0.984))}{0.984}$$

in which the molecular weight of the vinyl alcohol units are $M_{VA}=44.05$ and the one of vinyl acetate units $M_{VAc}=86.09$. The charged quantity of polyvinyl alcohol is therefore provided with $$\frac{100}{45.45} = 2.2 \text{ vinyl alcohol equivalents.}$$

The polyvinyl alcohol is converted subsequently with vanillin as natural substance containing carbonyl groups whose molecular weight is 152.
According to the formula $$\frac{\text{degree of saponification (mol \%) polyvinyl alcohol}}{2} - (40 \text{ to } 44)$$

the number of the carbonyl equivalents is to be in the range of 5.2 to 9.2 and thus in the range of $$\frac{98.4}{2} - (40 \text{ to } 44) = 9.2 \text{ to } 5.2 \text{ per } 100 \text{ vinyl equivalents.}$$

For performing the trial the number of carbonyl equivalents is thus assumed from this range with 6.6 per 100 vinyl alcohol equivalents, which corresponds to 0.145 carbonyl equivalents at 2.2 vinyl equivalents. This value multiplied by the molecular weight of 152 leads to the quantity of vanillin to be used, totalling 22 g. The polyvinyl alcohol solution of the kind mentioned above is now heated to 40° C. and charged with 22 g of powdered vanillin under agitation. Thereafter a solution of 3 g of 85% phosphoric acid is slowly added to 50 ml of distilled water by means of the dropping funnel.

The reaction mixture is heated under continuous mixing to 70° C. and kept at this temperature for five hours. Thereafter the reaction mixture is cooled off to room temperature under mixing and permitted to react at this temperature for further 20 hours under mixing.

The reaction mixture was carefully neutralized with diluted NaOH and then poured in by drops into a large excess of acetone, with the vinyl alcohol copolymers precipitating as sediment.

To remove any non-reacting residual share of vanillin, a charge of the freshly precipitated vinyl alcohol copolymer is distilled with water vapour. The removed vanillin can thus be reclaimed.

The cleaned vinyl alcohol copolymer and the remaining batch in the form of the undistilled raw product are cast into films in the following manner:

Both batches are dissolved in water and, after the addition of small quantities of glycerol for adjusting the film properties, are cast on to a glass plate and dried at approx. 80° C. into a film. The films had an acetalisation degree of 13 mol % (i.e. converted 6.5 carbonyl equivalents per 100 vinyl alcohol equivalents) and could be drawn off from the glass plate in thicknesses of 22 and 28 µm.

In water at a temperature of 20° C. the films detached under mixing within one minute.

In the "closed bottle test" according to W. K. Fischer*) for determining the biological degradability, the films showed a depletion of dissolved oxygen after 30 days at 20° C. according to 43% of the theoretical biological oxygen demand (TBOD).

This trial shows that the vinyl alcohol copolymer can be cast into films both in the purified as well as unpurified form without substantially impairing the properties of the film.

EXAMPLE 2

A film which is soluble in warm water 100 g of polyvinyl alcohol with a polymerisation degree of 1700 and a degree of saponification of 98.5%, thus corresponding to 2.2 vinyl alcohol equivalents (VA equ.), are converted, as given in example 1, with 12 g vanillin (molecular weight=152), i.e. with 12/152=0.08 carbonyl equivalents [carb. equ.].

The quantity ratio of carb. equ.:VA equ. was set according to the formula $$\frac{\text{degree of saponification (mol \%) PVA}}{2} - 45 \text{ at } 3.6 \text{ per } 100 \text{ VA } equ.$$

The film produced from the vinyl alcohol polymer (thickness 30 µm) had an acetalisation degree of 7 mol % and a tearing strength of 25 MPa. In water at a temperature of 60° C. the film detached under mixing within two minutes.

In the "closed bottle test" for determining the biological degradability according to Fischer the depletion of dissolved oxygen showed 43% TBOD after 30 days at 20° C.

EXAMPLE 3

A film which is soluble in warm water 100 g of polyvinyl alcohol with a polymerisation degree of 1400 and a degree of saponification of 98.5%, thus corresponding to 2.2 vinyl alcohol equivalents (VA equ.), are converted, as given in example 1, with 12 g of glucose (molecular weight=180), i.e. with 12/180=0.07 carbonyl equivalents [carb. equ.].

The quantity ratio of carb. equ.:VA equ. was set according to the formula $$\frac{\text{degree of saponification (mol \%) PVA}}{2} - 46.2 = 3.0/100 \text{ VA } equ.$$

The film had an acetalisation degree of 5.5 mol %. In water at a temperature of 60° C. the film detached under mixing within three minutes.

In the "closed bottle test" for determining the biological degradability according to Fischer*) the depletion of dissolved oxygen showed 49% TBOD after 30 days at 20° C.

EXAMPLE 4

A film which is soluble in hot water 100 g of polyvinyl alcohol with a polymerisation degree of 1800 and a degree of saponification of 98.5%, thus corresponding to 2.2 vinyl alcohol equivalents (VA equ.), are converted, as given in example 1, with 5 g of glucose (molecular weight=180), i.e. with 5/180=0.03 carbonyl equivalents [carb. equ.].

The quantity ratio of carb. equ.:VA equ. was set according to the formula $$\frac{\text{degree of saponification (mol \%) PVA}}{2} - 48 = 1.3/100 \text{ VA } equ.$$

The film had an acetalisation degree of 2.0 mol %. In water at a temperature of 95° C. the film detached under mixing within 5 minutes.

In the "closed bottle test" for determining the biological degradability according to Fischer*) the depletion of dissolved oxygen showed 44% TBOD after 30 days at 20° C.

EXAMPLE 5
A film which is soluble in cold water 100 g of polyvinyl alcohol with a polymerisation degree of 1000 and a degree of saponification of 98.5%, thus corresponding to 2.2 vinyl alcohol equivalents (VA equ.), are converted, as given in example 1, with 33 g of Na salt of glucuronic acid (molecular weight=216), i.e. with 33/216= 0.15 carbonyl equivalents [carb. equ.].

The quantity ratio of carb. equ.:VA equ. was set according to the formula $$\frac{\text{degree of saponification (mol \%) PVA}}{2} - 42.3 = 6.9/100 \text{ VA } equ.$$

The film had an acetalisation degree of 14 mol %. In water at a temperature of 25° C. the film detached under mixing within two minutes.

In the "closed bottle test" for determining the biological degradability according to Fischer*) the depletion of dissolved oxygen showed 44% TBOD after 30 days at 20° C.

EXAMPLE 6
A film which is soluble in hot water 100 g of polyvinyl alcohol with a polymerisation degree of 2800 and a degree of saponification of 98.5%, thus corresponding to 2.2 vinyl alcohol equivalents (VA equ.), are converted, as given in example 1, with 8 g Na salt of glucuronic acid (molecular weight=216), i.e. with 8/216= 0.04 carbonyl equivalents [carb. equ.].

The quantity ratio of carb. equ.:VA equ. was set according to the formula $$\frac{\text{degree of saponification (mol \%) PVA}}{2} - 47.6 = 1.7/100 \text{ VA } equ.$$

The film had an acetalisation degree of 3.0 mol %. In water at a temperature of 95° C. the film detached under mixing within 10 minutes.

In the "closed bottle test" for determining the biological degradability according to Fischer*) the depletion of dissolved oxygen showed 40% TBOD after 30 days at 20° C.

EXAMPLE 7
A film which is soluble in warm water 100 g of polyvinyl alcohol with a polymerisation degree of 1100 and a degree of saponification of 98.5%, thus corresponding to 2.2 vinyl alcohol equivalents (VA equ.), are converted, as given in example 1, with 25 g of maltose (molecular weight=342), i.e. with 25/342=0.07 carbonyl equivalents [carb. equ.].

The quantity ratio of carb. equ.:VA equ. was set according to the formula $$\frac{\text{degree of saponification (mol \%) PVA}}{2} - 45.9 = 3.3/100 \text{ VA } equ.$$

The film had an acetalisation degree of 6.0 mol %. In water at a temperature of 50° C. the film detached under mixing within 5 minutes.

In the "closed bottle test" for determining the biological degradability according to Fischer*) the depletion of dissolved oxygen showed 44% TBOD after 30 days at 20° C.

EXAMPLE 8
A film which is soluble in hot water 100 g of polyvinyl alcohol with a polymerisation degree of 1400 and a degree of saponification of 98.5%, thus corresponding to 2.2 vinyl alcohol equivalents (VA equ.), are converted, as given in example 1, with 15 g of maltose (molecular weight=342), i.e. with 15/342=0.04 carbonyl equivalents [carb. equ.].

The quantity ratio of carb. equ.:VA equ. was set according to the formula $$\frac{\text{degree of saponification (mol \%) PVA}}{2} - 47.3 = 2.0/100 \text{ VA } equ.$$

Departing from the film production method pursuant to example 1, the reaction mixture is delimited to a solids content of 30% (determined by drying in the drying oven at 120° C.) by evaporation of approx. 300 g water after the acetalisation reaction and the neutralization in vacuum. This leads to a viscosity of the mixture of 35,000 mPa.s at 20° C. 200 g of glycerol are added and the mixture is mixed in the vacuum at 60° C. until a gel phase arises at first and then a granulate.

In a further trial (=example 8a) this granulation process is speeded up in such a way that after the addition of glycerol 10 g of powdery, commercially available carboxymethyl cellulose is added. The granulate thus obtained is extruded into a film tube in a blow extruder with a central degassification section at 235° C. initial temperature for the extrusion and there-after with failing temperature up to the extruder die ($T_{exit}$=170° C.).

The film had an acetalisation degree of 3.0 mol %. In water at a temperature of 60° C. the film detached under mixing within 5 minutes.

In the "closed bottle test" for determining the biological degradability according to Fischer*) the depletion of dissolved oxygen showed 49% TBOD after 30 days at 20° C.

EXAMPLE 9
A film which is soluble in cold water 100 g of polyvinyl alcohol with a polymerisation degree of 700 and a degree of saponification of 98.5%, thus corresponding to 2.2 vinyl alcohol equivalents (VA equ.), are converted, as given in example 1, with 65 g of maltose (molecular weight=342), i.e. with 65/342=0.19 carbonyl equivalents [carb. equ.].

The quantity ratio of carb. equ.:VA equ. was set according to the formula $$\frac{\text{degree of saponification (mol \%) PVA}}{2} - 40.65 = 8.6/100 \text{ VA } equ.$$

No sedimentation with acetone was carried out subsequently, but after the reaction and neutralization there was a limitation to a viscosity of 35,000 mPa.s. The reaction mixture was scraped onto a glass plate. The "lacquer layer" on the glass plate was dried at 80° C. in the return air drying oven. Thereafter a film with the thickness of 100 $\mu$m could be drawn off.

The film had an acetalisation degree of 15 mol %. In water at a temperature of 95° C. the film detached under mixing within 5 minutes.

In the "closed bottle test" for determining the biological degradability according to Fischer*) the depletion of dissolved oxygen showed 59% TBOD after 30 days at 20° C.

EXAMPLE 10

A film which is soluble in warm/cold water 100 g of polyvinyl alcohol of the MOWIOL type with a polymerisation degree of 1100 and a degree of saponification of 91%, thus corresponding to 1.9 vinyl alcohol equivalents (VA equ.), are converted, as given in example 1, with 4 g of vanillin (molecular weight=152), i.e. with 4/152=0.03 carbonyl equivalents [carb. equ.].

The quantity ratio of carb. equ.:VA equ. was set according to the formula $$\frac{\text{degree of saponification (mol \%) PVA}}{2} - 44.1 = 1.4/100 \text{ VA } equ.$$

The film had an acetalisation degree of 2.5 mol %. In water at a temperature of 60° C. the film detached under mixing within three minutes.

In the "closed bottle test" for determining the biological degradability according to Fischer*) the depletion of dissolved oxygen showed 43% TBOD after 30 days at 20° C.

EXAMPLE 11

A film which is soluble in cold water 100 g of polyvinyl alcohol with a polymerisation degree of 1100 and a degree of saponification of 91%, thus corresponding to 1.9 vinyl alcohol equivalents (VA equ.), are converted, as given in example 1, with 10 g of glucose (molecular weight=180), i.e. with 10/180=0.06 carbonyl equivalents [carb. equ.].

The quantity ratio of carb. equ.:VA equ. was set according to the formula $$\frac{\text{degree of saponification (mol \%) PVA}}{2} - 42.6 = 2.9/100 \text{ VA } equ.$$

The film had an acetalisation degree of 5.0 mol %. In water at a temperature of 22° C. the film detached under mixing within three minutes.

In the "closed bottle test" for determining the biological degradability according to Fischer*) the depletion of dissolved oxygen showed 45% TBOD after 30 days at 20° C.

EXAMPLE 12

A film which is soluble in cold water 100 g of polyvinyl alcohol of the "MOWIOL type 18-88", which was manufactured by Hoechst company, with a polymerisation degree of 2700 and a degree of saponification of 88%, thus corresponding to 1.8 vinyl alcohol equivalents (VA equ.), are converted, as given in example 1, with 5 g of vanillin (molecular weight=152), i.e. with 5/152=0.03 carbonyl equivalents [carb. equ.].

The quantity ratio of carb. equ.:VA equ. was set according to the formula $$\frac{\text{degree of saponification (mol \%) PVA}}{2} - 42.2 = 1.8/100 \text{ VA } equ.$$

The film had an acetalisation degree of 3.5 mol %. In water at a temperature of 60° C. the film detached under mixing within 5 minutes.

In the "closed bottle test" for determining the biological degradability according to Fischer*) the depletion of dissolved oxygen showed 43% TBOD after 30 days at 20° C.

EXAMPLE 13

A film which is soluble in cold water 100 g of polyvinyl alcohol with a polymerisation degree of 1100 and a degree of saponification of 81%, thus corresponding to 1.56 vinyl alcohol equivalents (VA equ.), are converted, as given in example 1, with 3 g of maltose (molecular weight=342), i.e. with 3/342=0.01 carbonyl equivalents [carb. equ.].

The quantity ratio of carb. equ.:VA equ. was set according to the formula $$\frac{\text{degree of saponification (mol \%) PVA}}{2} - 40 = 0.6/100 \text{ VA } equ.$$

The film had an acetalisation degree of 1.0 mol %. In water at a temperature of 20° C. the film detached under mixing within 3 minutes.

In the "closed bottle test" for determining the biological degradability according to Fischer*) the depletion of dissolved oxygen showed 49% TBOD after 30 days at 20° C.

EXAMPLE 14

A film which is soluble in warm/cold water

In a first preliminary test to determine the solubility behaviour, 100 g of PVA with a polymerisation degree of 1400 and a degree of saponification of 88% are converted, as described above, with 70 g of starch in the presence of 5 g of concentrated HCl until a clear solution arises.

Thereafter, in a second preliminary test and to determine the starch degradation, the process is carried out in an analogous method without PVA in a sample by means of the oxime titration according to H. Schulz et. al. in order to determine the carbonyl equivalent. The measured carbonyl equivalent is 6800.

Thereafter the main reaction batch was carried out as follows:

100 g of polyvinyl alcohol with a polymerisation degree of 1000 and a degree of saponification of 88%, thus corresponding to 1.79 vinyl alcohol equivalents (VA equ.), are converted with 70 g of starch (carbonyl equivalent weight after degradation under reaction conditions=6800), i.e. with 70/6800=0.01 carbonyl equivalents=[carb. equ.] under phosphoric acid catalysis.

The quantity ratio of carb. equ.:VA equ. was set according to the formula $$\frac{\text{degree of saponification (mol \%) PVA}}{2} - 43.4 = 0.6/100 \text{ VA } equ.$$

The film had an acetalisation degree of 1.0 mol %. In water at a temperature of 30° C. the film detached under mixing within 3 minutes.

In the "closed bottle test" for determining the biological degradability according to Fischer*) the depletion of dissolved oxygen showed 49% TBOD after 30 days at 20° C.

In a further test, a glass bottle is coated at the edge of the bottle opening with an approx. 30 μm thick layer of the produced film. For this purpose the edge of the bottle was coated several times with the PVA solution, as was obtained as completely reacted reaction mixture according to the said method, and then dried at 80° C.

The bottle thus pre-treated was sealed with an aluminium foil lid with the usual hot sealing method, thus leading to an absolute leak-proof closure which was still sealed after standing for several weeks with milk as the filling material. The foil lid could be easily removed at any time. During the washing out of the bottle in a usual dish-washing machine the "sealing lacquer" film was removed entirely.

EXAMPLE 15
A film which is soluble in warm/cold water

In a first preliminary test to determine the solubility behaviour, 100 g of PVA of type MOWIOL 4-98 of HOECHST Company with a polymerisation degree of 600 and a degree of saponification of 98.4% are converted, as described above, with 900 g of water-soluble starch in the presence of 5 g of concentrated $H_3PO_4$ until a clear solution arises.

Following this, in a second preliminary test and to determine the starch degradation, the process is carried out in an analogous method in a sample by means of the oxime titration according to H. Schulz et. al. in order to determine the carbonyl equivalent of the degraded starch arising under the reaction conditions. The obtained value was 5200.

Thereafter the main reaction batch was carried out as follows:

100 g of polyvinyl alcohol with a polymerisation degree of 600 and a degree of saponification of 98.4%, thus corresponding to 1.79 vinyl alcohol equivalents (VA equ.), are converted with 900 g of starch (carbonyl equivalent weight after degradation under reaction conditions=5200), i.e. with 900/5200=0.17 carbonyl equivalents=[carb. equ.] in the presence of 5 g of concentrated HCl instead of the phosphoric acid catalysis.

The film with a thickness of 25 μm had an acetalisation degree of 15.0 mol %.

In water a t a temperature of 30° C. the film detached under mixing within 1 minute.

In the "closed bottle test" for determining the biological degradability according to Fischer*) the depletion of dissolved oxygen showed 65% TBOD after 30 days at 20° C.

Comparative Example 1 According to the Doctrine Pursuant to EP-A2-283180

A method as given in example 1, with the only difference that 75 g of PVA (polymerisation degree 1000; degree of saponification 98.5%) are converted in 425 g of water with 14.2 g of Na salt of 2-benzaldehyde-sulphonic acid.

The film had an acetalisation degree of 7.7 mol %. In water at a temperature of 20° C. the film detached under mixing within 30 seconds.

In the "closed bottle test" for determining the biological degradability according to Fischer*) the depletion of dissolved oxygen only showed 25% TBOD after 30 days.

Comparative Example 2

50% of water-soluble starch and 8% nonyl phenol-8-ethylene oxide adduct are kneaded into a polyvinyl alcohol acetal (mean polymerisation degree 1700; 15 mol % acetalated with acetaldehyde) in the presence of water for producing a thermoplastic mass. This mass was converted into cast granules by extrusion and extruded into a film in a second process step.

In water at a temperature of 20° C. the film detached under mixing within 3 minutes.

The film had an acetalisation degree of 7.7 mol %.

In the "closed bottle test" for determining the biological degradability according to Fischer*) the depletion of dissolved oxygen only showed 33% TBOD after 30 days.

*) W. K. Fischer; Fette, Seifen, Anstrichmittel 65/1 (1963) 37 and Tenside Detergents 8/4 (1971) 182

Owing to the specific test conditions with simultaneous degradation of substrate by complete respiration, in addition to substrate degradation by the formation of substance belonging to the bodies of micro-organisms, the "closed bottle" test according to Fischer shows at 40% degradation within 30 days a biological degradability corresponding to more than 80% in the 3 hours Husmann test.

Water-soluble films containing the vinyl alcohol copolymers in accordance with the invention are provided, whose water solubility can be adjusted to the desired solution temperature. These water-soluble films are used as packaging materials and as auxiliaries, e.g. in the form of sealing lacquers.

We claim:

1. A method for producing a granulate, consisting of a vinyl alcohol copolymer with the proviso that said vinyl alcohol copolymer is produced by acid catalysed acetalization reaction of polyvinyl alcohol with a degree of saponification of 80 to 99.5 mol % with natural starch or derivative thereof containing one carbonyl or presumptive carbonyl group, wherein said process comprises carrying out the acid-catalysed conversion of the polyvinyl alcohol copolymer with said natural starch or derivative thereof containing one carbonyl or presumptive carbonyl group in an extruder and extruding said vinyl alcohol copolymer through a die of said extruder.

2. A method for producing a water-soluble film which comprises carrying out an acetalization-reaction in an extruder to form a granulate comprising a vinyl alcohol copolymer, in such a way that said granulate is produced from a polyvinyl alcohol with a mean polymerisation degree in a range of 500 to 2800 by acid-catalysed reaction with natural starch or derivative thereof containing one carbonyl group in a ratio corresponding to the number of carbonyl equivalents per 100 vinyl alcohol equivalents of the polyvinyl alcohol, which ratio corresponds to the formula $$\frac{\text{degree of saponification [mol \%] of PVA}}{2} - 47.6 \text{ to } 49$$

with the proviso that said vinyl alcohol copolymer is produced by acid catalysed acetalization reaction of polyvinyl alcohol with a degree of saponification of 80 to 99.5 mol % natural starch or derivative thereof containing one carbonyl- or presumptive carbonyl group; and then forming by means of said extruder or by means of a separate extruder a film out of said granulate, which film's solubility behaviors is adjustable to a maximum solubility temperature of 60 to 80° C.

3. A method for producing a water-soluble film which comprises carrying out an acetalization-reaction in an extruder to form a granulate comprising a vinyl alcohol copolymer, in such a way that said granulate is produced from a polyvinyl alcohol with a mean polymerisation degree in a range of 300 to 1500 by acid-catalysed reaction with natural starch or derivative thereof containing one carbonyl group in a ratio corresponding to the number of carbonyl equivalents per 100 vinyl alcohol equivalents of the polyvinyl alcohol, which ratio corresponds to the formula $$\frac{\text{degree of saponification [mol \%] of } PVA}{2} - 44 \text{ to } 47.5$$

with the proviso that said vinyl alcohol copolymer is produced by acid catalysed acetalisation reaction of polyvinyl alcohol with a degree of saponification of 80 to 99.5 mol %, with said natural starch or derivative thereof containing one carbonyl- or presumptive carbonyl group and then forming by means of said extruder or by means of a separate extruder a film out of said granulate, which film's solubility behaviour is adjustable to a maximum solubility temperature of 40 to 60° C.

4. A method for producing a water-soluble film which comprises carrying out an acetalization-reaction in an extruder to form a granulate comprising a vinyl alcohol copolymer, in such a way that said granulate is produced from a polyvinyl alcohol with a mean polymerisation degree in a range of 200 to 2700 by acid-catalysed reaction with natural starch or derivative thereof containing one carbonyl group in a ratio corresponding to the number of carbonyl equivalents per 100 vinyl alcohol equivalents of the polyvinyl alcohol, which ratio corresponds to the formula $$\frac{\text{degree of saponification [mol \%] of } PVA}{2} - 40 \text{ to } 44$$

with the proviso that said vinyl alcohol copolymer is produced by acid catalysed acetalization reaction of polyvinyl alcohol with a degree of saponification of 80 to 99.5 mol %, with said natural starch or derivative thereof containing one carbonyl- or presumptive carbonyl group and then forming means of said extruder or by means of a separate extruder a film out of said granulate, which film's solubility behaviour is adjustable to a maximum solubility temperature of 20 to 40° C.

5. A method for producing a water-soluble film according to claim 2 wherein the vinyl alcohol copolymer is produced in the same extruder in which the film is formed.

6. A method for producing a water-soluble film according to claim 3 wherein the vinyl alcohol copolymer is produced in the same extruder in which the film is formed.

7. A method for producing a water-soluble film according to claim 4 wherein the vinyl alcohol copolymer is produced in the same extruder in which the film is formed.

* * * * *